United States Patent

[11] 3,626,145

[72] Inventor James F. Jackson
 Franklin, Ohio
[21] Appl. No. 7,946
[22] Filed Feb. 2, 1970
[45] Patented Dec. 7, 1971
[73] Assignee Armco Steel Corporation
 Middleton, Ohio

[54] MAGNETIC CONTROL OF ARC ENVIRONMENT
 7 Claims, 3 Drawing Figs.
[52] U.S. Cl.................................................. 219/123,
 219/125
[51] Int. Cl..................................................... B23k 9/08
[50] Field of Search......................................... 219/123,
 124, 125, 125 PL, 60, 61; 318/576

[56] References Cited
 UNITED STATES PATENTS

| | | | |
|---|---|---|---|
| 2,702,846 | 2/1955 | Breymeier.................... | 219/123 Y |
| 3,551,637 | 12/1970 | Lampson...................... | 219/123 |
| 1,792,243 | 2/1931 | Richter......................... | 219/123 X |
| 2,971,079 | 2/1961 | Sommeria ..................... | 219/125 |
| 2,994,763 | 8/1961 | Schultz.......................... | 219/123 |
| 3,076,889 | 2/1963 | Enk................................ | 219/125 |
| 3,268,805 | 8/9166 | Normands..................... | 219/125 X |

Primary Examiner—J. V. Truhe
Assistant Examiner—L. A. Schutzman
Attorney—Melville, Strasser, Foster & Hoffman

ABSTRACT: Control means for the arc of an automatic DC electric welding device comprising an electromagnet with its magnetic poles aligned perpendicular to the arc and the seam to be welded and providing a preselected and optimized magnetized environment for the arc. A Hall-effect probe is located immediately ahead of the welding arc to detect the magnitude and direction of the effect on the magnetic environment of detrimental magnetic fields in the immediate vicinity of the welding operation. The Hall-effect probe is connected through a detector circuit and a control circuit to the power supply for the electromagnet. Upon detection of the magnitude and direction of the effect of a detrimental magnetic field by the Hall-effect probe, appropriate adjustment is made of the power supplied to the electromagnet through the detector and control circuits, enabling the electromagnet to nullify the effect of the detrimental field on the preselected magnetic environment.

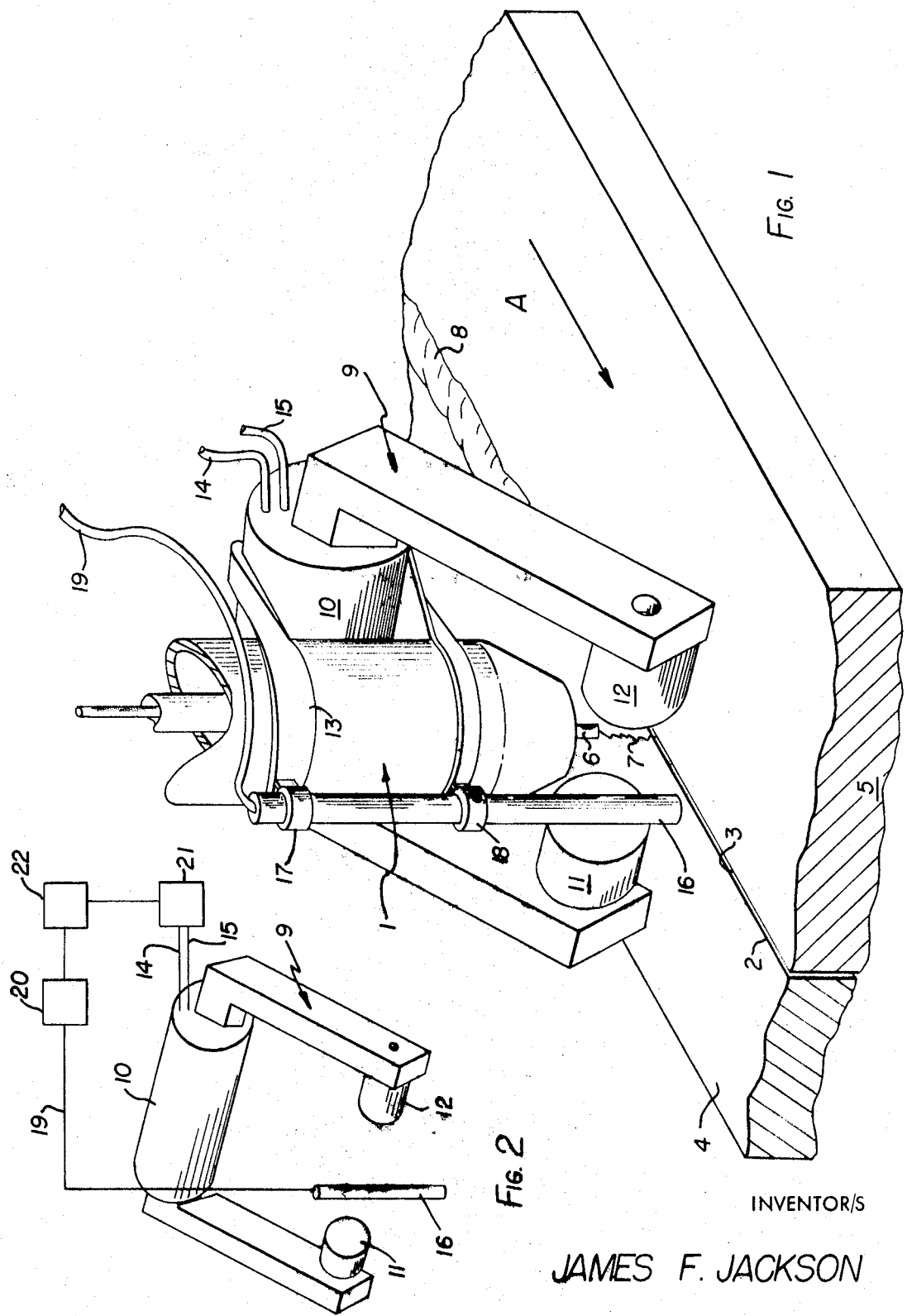

PATENTED DEC 7 1971

INVENTOR/S

JAMES F. JACKSON

BY *Melville, Strasser, Foster and Hoffman*
ATTORNEYS

MAGNETIC CONTROL OF ARC ENVIRONMENT

BACKGROUND OF THE INVENTION

1. Field of the Invention

The invention relates to the control means for the arc of an automatic DC welding device, and more particularly to control means capable of establishing a preselected and optimized environment about the arc and detecting and nullifying effects on that environment by detrimental magnetic fields in the immediate vicinity of the welding operation.

2. Description of the Prior Art

The obtaining of a proper weld seam through the use of an automatic welding device presents numerous problems. Heretofore, prior art workers have devoted much time and effort to the solution of these problems. For example, electromechanical seam tracking and flaw detecting devices have been developed such as those taught in U.S. Pat. Nos. 2,971,079 and 3,268,805. While such devices are capable of automatically controlling the position of the welding electrode with respect to the seam, they are not capable of compensating for arc stray or arc blow. While a number of factors may produce arc stray or drift and arc blow, local magnetic effects in the vicinity of the arc constitute a primary cause. As used hereinafter, the term "arc blow" relates to that condition which obtains when abnormal magnetic fields occur across the seam. These transverse fields cause the arc to bend in a direction along the seam being welded and may be so severe as to momentarily break (or blow out) the arc. This results in the "sputtering" of the welding arc and therefore provides an unsatisfactory weld.

As used hereinafter, the term "arc stray" or the term "arc drift" is used to denote that condition wherein the arc is not properly located at the seam to be welded. While local magnetic effects in the vicinity of the arc may cause this condition, mechanical reasons may cause it as well. The welding arc will seek the shortest path to the material being welded. Thus, if the welding electrode is off to one side of the seam, the welding arc may also be improperly placed. Similarly, if one edge of the seam to be welded is higher than the other, the arc may seek a path to this high point, rather than to the seam. Irrespective of the cause, a poor weld results from arc stray or drift because incomplete fusion of the metal is obtained along the abutting edges of the pieces being welded.

Heretofore, prior art workers have attempted to minimize arc stray or drift by setting up a magnetic field about the arc through the use of a permanent magnet. In some embodiments, the orientation of the permanent magnet can be varied, so as to change the orientation of the magnetic field, thereby to direct the arc as desired. An example of such stabilizing means is taught in U.S. Pat. No. 2,475,183. While such devices tend to stabilize the arc and are capable of bending the arc in any direction, they are not automatically responsive to transient or variable magnetic effects in the vicinity of the arc. They necessitate manual operation and require that the arc be viewed by the operator. This is not always possible, as for example, in the instance of submerged arc welding, wherein a blanket of opaque flux material is deposited around the arc and hides the arc from view.

U.S. Pat. No. 2,994,763 teaches an arc control means wherein an electrical arc deflection means in the form of an electromagnetic is controlled by a pair of photoelectric cells positioned to sense arc stray or drift. In this instance, the electromagnet is so oriented that the electric field set up thereby is parallel to the seam being welded. Such a device is only capable of deflecting the arc perpendicular to the seam and cannot correct for arc blow. Such a device will not modify transverse fields, nor will it control arc bending in the direction of the seam.

The photoelectric sensing device of the last-mentioned patent requires a clear optical path to the arc, which is rare in most industrial environments. This requirement also prohibits the use of the highly popular submerged arc technique.

Arc control devices, utilizing an electromagnet, to provide a field parallel to the seam being welded, are in commercial use, but it has been found that for satisfactory results it is necessary to cause the arc to sweep back and forth across the seam in a pendulum motion.

The present invention is directed to a means whereby a preselected and optimized magnetic environment is located about the arc by means of an electromagnet creating a magnetic field perpendicular both to the arc and to the seam being welded. This preselected magnetic environment is maintained constant irrespective of detrimental magnetic fields in the vicinity of the arc or in the material being welded. In addition, the sensing device of the present invention does not require a clear optical path to the arc.

It is known that there is an optimum angle of impingement of the arc in the seam being welded which will yield maximum efficiency of the welding operation. The device of the present invention is not only capable of maintaining the desired angle of impingement, but also is able to prevent arc blow.

The device of the present invention can aid in the prevention of arc stray by maintaining the arc centered with respect to the poles of the electromagnet.

SUMMARY OF THE INVENTION

The present invention contemplates an arc control means applicable to any conventional automatic DC electric welding head. An electromagnet is located in association with the welding head and has its magnetic poles aligned perpendicular to both the arc and the seam being welded. The electromagnet is connected to a variable power supply means and is capable of setting up a preselected and optimized magnetic environment about the arc.

A magnetic field detector in the form of a Hall-effect probe, is positioned directly over the unwelded seam and immediately ahead of the arc. The probe monitors the preselected and optimized magnetic environment about the arc created by the electromagnet. The probe detects the magnitude and direction of effects on this magnetic environment caused by detrimental magnetic fields in the environment of the arc, or in the material being welded. The probe sends an output signal through an appropriate detector circuit and control circuit to vary the output of the power supply to the electromagnet, whereby the preselected environment may be maintained and the effects of the detrimental fields may be nullified.

BRIEF DESCRIPTION OF THE DRAWINGS

FIG. 1 is a perspective view of an automatic welding head with the arc control device of the present invention affixed thereto.

FIG. 2 is a diagrammatic representation of the circuitry of the control device of the present invention.

DESCRIPTION OF THE PREFERRED EMBODIMENTS

Figure 3:
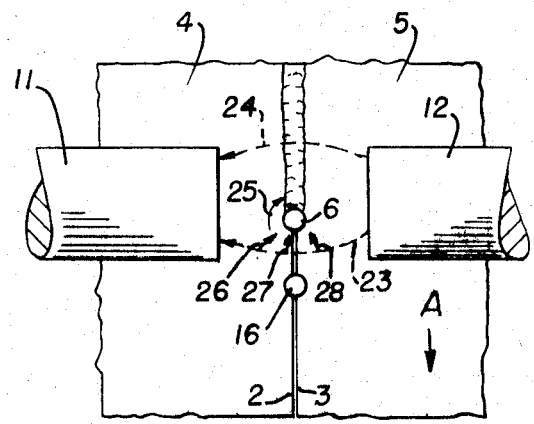
FIG. 3 is a diagrammatic plan view illustrating the seam to be welded, the electrode, the Hall-effect probe, the pole pieces of the electromagnet and an exemplary line of force in the magnetic environment set up by the electromagnet.

FIG. 1 illustrates an automatic welding head, generally indicated at 1, and located directly above abutted edges 2 and 3 of two pieces of metallic material 4 and 5 to be joined. The electrode of the welding head is indicated at 6, and the arc extending therefrom is diagrammatically shown at 7. A weld bead, produced by the arc, is shown at 8. Finally, the welding direction is indicated by arrow A.

As used herein, the phrase "welding direction" may be defined as that direction in which the weld bead progresses with respect to the material being welded. The present invention is applicable to both that type of automatic welding wherein the material being welded is held stationary and the welding head is moved in the welding direction, or that type of welding wherein the welding head is maintained stationary and the material being welded is moved in a direction opposite the welding direction.

The device of the present invention may be used with any type of DC electric arc welding (inclusive of submerged arc welding) and with particular advantages in the welding of ferromagnetic materials, as will be described hereinafter. Welding heads differ in shape and size, according to the particular requirements of the welding to be done and the method used to shield the weld from oxidation (such as submerged arc welding, or the like). It is within the scope of the present invention to modify the components thereof so that they may be used in any welding application. In general, such modifications will be substantially limited to the manner in which the components will be mounted with respect to a particular welding head. Such modifications are well within the skill of the worker in the art. Finally, the device of the present invention can be used in welding applications which employ either a nonconsuming electrode or a consuming electrode.

An electromagnet is generally indicated at 9. The electromagnet has a coil 10 and pole pieces 11 and 12. The electromagnet is so oriented as to have its pole pieces 11 and 12 aligned perpendicular to the welding arc 7 and the seam formed by the edges 2 and 3 of the ferromagnetic material.

As indicated above, the manner in which the electromagnet is supported with respect to the automatic welding head does not constitute a limitation on the invention and may vary depending upon the type of automatic welding head used. For purposes of an exemplary showing, the electromagnet 9 is illustrated as being affixed directly to the welding head 1 by a band 13. The coil of the electromagnet has a pair of leads 14 and 15, extending to a variable power supply (see FIG. 2).

FIG. 1 illustrates a conventional Hall-effect probe 16, capable of detecting the magnitude and direction of effects in the magnetic environment set up about the arc by the electromagnet 9. Such a probe is well known in the art and comprises a small semiconductor device which, when placed in a magnetic field, produces a voltage proportional to the strength and polarity of the field. As is well known, a small current from a power source is made to flow through the probe. The power source (not shown) is generally a source of direct current. This current passes uniformly and steadily axially of the probe, between electrodes located at the ends thereof. When the probe is located in a magnetic field passing perpendicularly therethrough, the path of the current is deflected and appropriately placed additional electrodes, associated with the probe, sense this modified current distribution and produce a corresponding reading on an appropriate indicator device. Once this reading has been established for the preselected and optimized magnetic environment set up about the arc by the electromagnet 9, any change in this reading will be an indication of the magnitude and direction of the detrimental magnetic field causing the change.

The probe 16 is mounted directly ahead of the arc 7 and directly above the seam between edges 2 and 3 of the material being welded. Again, the manner in which the probe 16 is supported does not constitute a limitation on the present invention and may vary depending upon the type of automatic welding head used. For purposes of an exemplary showing the probe 16 is illustrated in FIG. 1 as being mounted on a pair of annular brackets 17 and 18 affixed to the band 13. The probe has a lead 19 by which its output signal may be transmitted to appropriate detector and control circuits, as will be described hereinafter.

FIG. 2 is a diagrammatic representation of the circuitry of the control device of the present invention. The Hall-effect probe 16 and its output signal lead 19 are shown (like parts having been given like index numerals). Similarly, the electromagnet 9 and its leads 14 and 15 are shown (again like parts having been given like index numerals).

The output signal lead 19 of the probe 16 is connected to a detector circuit, diagrammatically indicated at 20. The element 20 may be any suitable form of field-strength meter capable of producing an output signal voltage proportional to the input from the probe 16. Frequently, a Hall-effect probe and suitable field-strength meter can be obtained commercially as a package. For purposes of providing a nonlimiting example, a Gaussmeter powered by 110 volt, 60 cycle, AC current was used with success.

The coil 10 of the electromagnet 9 is connected by leads 14 and 15 to a variable source of direct current 21. A control circuit 22 is connected to the variable power supply 21 so as to vary the current output thereof.

The variable power supply 21 for the electromagnet 9 can, again, be any one of a number of well known and commercially available units. The power supply of the type contemplated is capable of being controlled remotely, i.e., the current delivered by it is varied approximately ±10 amps in response to a small external signal voltage supplied to the control unit 22. Generally, the power supply 21 and its control circuit or unit 22 is available commercially as a unitary package.

As indicated in FIG. 2, the control circuit 22 for the power supply 21 is connected to the detector circuit or field-strength meter 20. The small signal voltage required by the control circuit 22 to vary the output of the power supply 21 is obtained from the output terminals of the detector circuit 20. From the above description, it will be evident that the current to the coil 10 of the electromagnet 9 will be varied in accordance with the output signal of the probe 16. Thus, any change in the preselected and optimized magnetic environment set up by the electromagnet 9 will be detected by the probe and the environment will be maintained by appropriate changes in the current supplied to the coil 10 of the electromagnet.

The operation of the control device of the present invention may be described as follows. The electric arc 7 which may be regarded as charged particles in motion, can be bent in a direction which is perpendicular to the imposed magnetic field. Since, the electromagnet 9 is so oriented as to have its pole pieces 11 and 12 aligned perpendicular both to the arc and to the seam between edges 2 and 3 of workpieces 4 and 5, the field set up between pole pieces 11 and 12 will tend to bend the arc in a direction along the seam. Thus, by controlling the amount of bend via the strength of the imposed magnetic field, arc blow can be avoided and an optimum angle of impingement by the arc can be controlled. Since the magnitude of the bending of the arc is proportional to the strength of the magnetic field, and the direction of bending is determined by the direction of the magnetic field (i.e., the polarity of the electromagnet 9), an appropriate current to the coil 10 of the electromagnet will set up a preselected and optimized magnetic environment about the arc causing the correct amount of bending thereof. In this way, arc blow is avoided, and the efficiency of the welding unit can be increased manyfold by virtue of the control of the correct angle of impingement by the arc.

In addition to the above, the control device of the present invention is also capable of limiting the motion of the arc perpendicular to the weld seam, by virtue of the shape of the magnetic field produced about the arc. This is generally illustrated in the diagrammatic representation set forth in FIG. 3. There, the workpieces 4 and 5 with their abutting edges 2 and 3 are shown, together with the pole pieces 11 and 12 of the electromagnet, the electrode 6 and the Hall-effect probe 16. Again, the welding direction is indicated by the arrow A.

For purposes of an exemplary showing, pole piece 12 may be considered the north pole, and pole piece 11 the south pole so that the magnetic field therebetween may be represented by magnetic lines of force passing from pole piece 12 to pole piece 11. For present purposes, only two such magnetic lines of force are shown, at 23 and 24. It will be noted that the magnetic lines of force tend to bulge between the poles so that, when considered in the three-dimensional sense, they could be envisioned as forming a football-shaped configuration. It will be noted that the electrode 6 is located slightly forwardly of the centerline of pole pieces 11 and 12 (in the welding direction).

Since the arc may be considered as charged particles in motion, it will be understood that it will have its own encircling magnetic field, which for purposes of illustration may be indicated by the clockwise arrow 25. From this diagrammatic representation it will be seen that the encircling magnetic field tends to add with the magnetic field of the electromagnet on one side of the arcs path, while the two magnetic fields tend to nullify each other on the other side of the arcs path. Thus, with the electrode positioned as shown, the arc therefrom will tend to bend slightly along the weld seam in a direction opposite to the welding direction. Similarly, anywhere along the magnetic line of force 23, by virtue of its shape, there will be a force tending to center the arc on a line midway between pole pieces 11 and 12. This is indicated by arrows 26 through 28. It will be understood by one skilled in the art that if the electrode were located on the other side of the centerline of poles 11 and 12, all other things remaining the same, the forces on the arc would tend to cause it to diverge toward one or the other of the poles.

From the foregoing discussion, it will be seen that not only can an optimum angle of impingement of the arc on the seam to be welded be maintained, but also the forces work to center the arc on a centerline between poles 11 and 12. Thus, so long as this centerline can be made to correspond to the seam to be welded, the stabilized arc will properly impinge the seam with a great increase in welding efficiency. This is true because less power is required and the relative movement between the welding head and the workpieces can be greatly increased in speed.

Thus, the magnetic field between poles 11 and 12 will be adjusted so as to produce an optimum magnetic environment about the arc. As described above, the Hall-effect probe, through the sensing and control circuits, will maintain this optimum environment despite the effects of detrimental magnetic fields in the environment of the arc or in the workpieces 4 and 5.

Modifications may be made in the invention without departing from the spirit of it. For example, the control device of the present invention may be manually controlled, rather than automatic. In such an instance, the power supply 21 may be of the type which is controllable by a knob, so that manual movement of the knob will vary the power supplied to the coil 10 of the electromagnet 9. In such an instance, the operator need only observe the readings on the field-strength meter 20 and adjust the output of the power supply 21 accordingly. Such an arrangement does not require a clear line of sight to the arc.

Other known magnetic environment-monitoring devices may be substituted for the Hall-effect probe 16. Such devices, however, generally have moving parts (such as a small rotating coil or the like), thereby adding a maintenance problem. The Hall-effect probe has no moving parts.

The embodiments of the invention in which an exclusive property or privilege is claimed are defined as follows:

1. Control means for the arc of an automatic DC electric welding device of the type comprising a welding head and an electrode and adapted to weld a seam in metallic material, said controls means comprising means for creating a magnetic field about said arc in an orientation perpendicular to said arc and to said seam, said magnetic field being so adjusted as to create an optimized magnetic environment about said arc to stabilize said arc and impart thereto a desired angle of impingement on said seam, means for adjusting the strength of said field, means for monitoring and indicating any deviation in said optimized magnetic environment and means for actuating said field-strength adjusting means in accordance with said indications of said monitoring means so as to maintain said optimized magnetic environment about said arc.

2. The structure claimed in claim 1 wherein said means for creating said magnetic field comprises an electromagnet, said electromagnet having pole pieces aligned perpendicular to said arc and said seam.

3. The structure claimed in claim 1 wherein said monitoring and indicating means comprises a Hall-effect probe, the output of said Hall-effect probe being connected to a field-strength meter, said Hall-effect probe being mounted in said magnetic environment ahead of said electrode in the welding direction.

4. The structure claimed in claim 1 including means to change the polarity of said magnetic field.

5. The structure claimed in claim 2 wherein said monitoring and indicating device comprises a Hall-effect probe, the output of said probe being connected to a field-strength meter, said probe being mounted on a centerline between said pole pieces and ahead of said electrode in said welding direction.

6. The structure claimed in claim 5 wherein said means for adjusting the strength of said field comprises a variable power source connected to the coil of said electromagnet.

7. The structure claimed in claim 6 wherein said means for actuating said field-strength adjusting means comprises means for varying the output of said variable power supply, said actuating means being responsive to a small signal voltage, said field-strength meter supplying said small signal voltage in proportion to the output signal of said Hall-effect probe.

* * * * *